United States Patent
Amemura

(10) Patent No.: US 9,047,447 B2
(45) Date of Patent: Jun. 2, 2015

(54) ELECTRONIC DEVICE SYSTEM AND ELECTRONIC DEVICE

(71) Applicant: Tatsuaki Amemura, Osaka (JP)

(72) Inventor: Tatsuaki Amemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 5 days.

(21) Appl. No.: 13/687,118

(22) Filed: Nov. 28, 2012

(65) Prior Publication Data

US 2013/0139251 A1    May 30, 2013

(30) Foreign Application Priority Data

Nov. 29, 2011  (JP) ................................. 2011-260620

(51) Int. Cl.
| | |
|---|---|
| *G06F 21/71* | (2013.01) |
| *G06F 21/12* | (2013.01) |
| *G06F 12/14* | (2006.01) |
| *G06F 21/85* | (2013.01) |

(52) U.S. Cl.
CPC .......... *G06F 21/123* (2013.01); *G06F 12/1416* (2013.01); *G06F 21/71* (2013.01); *G06F 21/85* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 5,710,815 | A * | 1/1998 | Ming et al. ..................... | 380/241 |
| 5,854,891 | A * | 12/1998 | Postlewaite et al. ............ | 726/20 |
| 7,546,956 | B2 * | 6/2009 | Adams et al. ............ | 235/472.01 |
| 7,831,837 | B1 * | 11/2010 | Duane et al. .................. | 713/185 |
| 2002/0065044 | A1 | 5/2002 | Ito | |
| 2004/0153554 | A1 | 8/2004 | Kawakami | |

FOREIGN PATENT DOCUMENTS

| | | |
|---|---|---|
| CN | 101882114 A | 11/2010 |
| JP | 3-283868 A | 12/1991 |
| JP | 2002-171303 A | 6/2002 |
| JP | 3091678 U | 2/2003 |
| JP | 2004-234331 A | 8/2004 |
| JP | 2005-275653 A | 10/2005 |
| JP | 2007-241565 A | 9/2007 |

* cited by examiner

*Primary Examiner* — Gilberto Barron, Jr.
*Assistant Examiner* — Malcolm Cribbs
(74) *Attorney, Agent, or Firm* — Birch, Stewart, Kolasch & Birch, LLP

(57) ABSTRACT

When a connection device is connected to an SD socket of an electronic device, a process setting unit of the electronic device obtains permission/inhibition information (an output signal) set forth in a permission/inhibition information setting unit of the connection device. Based on the obtained permission/inhibition information, the process setting unit identifies an execution unit whose operation is to be activated among the execution units provided in the electronic device. Then, the process setting unit instructs the identified execution unit to start operation. This realizes operation of execution units in correspondence to the permission/inhibition information.

6 Claims, 6 Drawing Sheets

F I G. 2
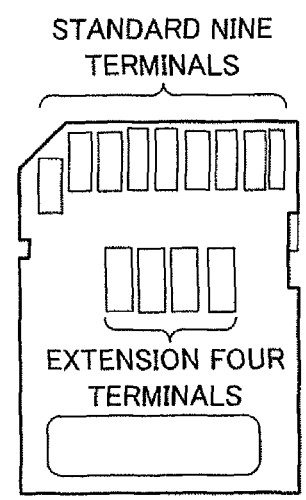

F I G. 4

| OUTPUT SIGNAL | EXECUTION UNITS TO BE ACTIVATED |
|---|---|
| (1,1,1,1) | ALL EXECUTION UNITS |
| (1,1,0,1) | CLOCK GENERATOR |
| (1,0,1,0) | RAID CONTROLLER |
| (1,0,0,0) | LAN CONTROLLER |
| OTHER | NOTHING |

F I G. 5
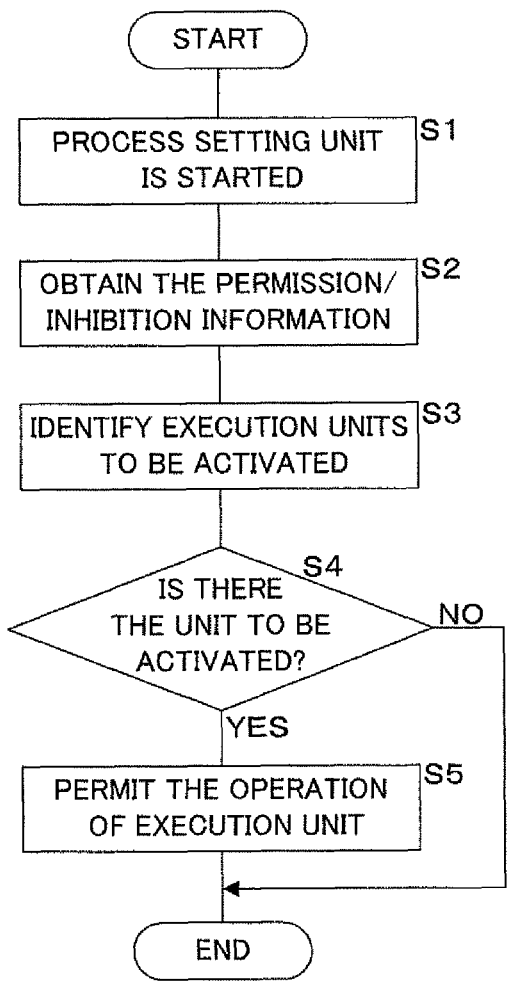

F I G. 6

| EXECUTION UNIT INFORMATION | LEVEL |
|---|---|
| CLOCK GENERATOR | 8 (1000 IN BINARY) |
| RAID CONTROLLER | 6 (0110 IN BINARY) |
| LAN CONTROLLER | 10 (1010 IN BINARY) |

ELECTRONIC DEVICE SYSTEM AND ELECTRONIC DEVICE

CROSS-REFERENCE TO RELATED APPLICATION

This Non-provisional application claims priority under 35 U.S.C. §119(a) on Patent Application No. 2011-260620 filed in Japan on Nov. 29, 2011, the entire contents of which are hereby incorporated by reference.

BACKGROUND

1. Technical Field

The present invention relates to: an electronic device system comprising an electronic device and a connection device allowed to be connected to the electronic device; and the electronic device.

2. Description of Related Art

When electronic devices are manufactured, usually, plural kinds of electronic devices having mutually different functions or performances are manufactured like low-end articles, high-end articles, products for domestic markets, and products for foreign markets. Conventionally, manufacturing of electronic devices having mutually different functions or performances has been achieved by changing the hardware configurations, for example, by changing the kinds of the components to be mounted or by changing the number of components to be mounted.

On the other hand, in electronic devices including personal computers and television receivers, some of these are provided with connection interfaces used for connection with external devices. Then, when an external device is connected to such an electronic device through a connection interface, a function is added to the electronic device (for example, see Japanese Patent Application Laid-Open No. 2002-171303). An example of such a connection interface is of SDIO (Secure Digital Input Output) standard.

SUMMARY

However, the approach that the hardware configurations are changed when electronic devices having mutually different functions or performances are manufactured causes a facility problem that a dedicated manufacturing facility is necessary for each kind of electronic device. Further, in the manufacturing process, a possibility arises that mistakes occur in the component mounting. Thus, when quality control for the components is intensified in order to avoid mistakes in the component mounting, a cost problem arises. That is, an increase is caused in the quality control expense. Further, a personnel problem arises that workers need have technical knowledge for each electronic device.

The present invention has been made with the aim of solving the above problems. It is an object to provide an electronic device system and an electronic device in which manufacturing of plural kinds of electronic devices having mutually different functions or performances is achieved without the necessity of changing the hardware configurations.

An electronic device system according to the present invention is an electronic device system comprising: an electronic device executing process; and a connection device allowed to be connected to the electronic device, wherein the connection device includes a storage unit storing permission/inhibition information that indicates whether execution of process allowed to be executed by the electronic device is permitted, the electronic device includes: an obtaining unit obtaining permission/inhibition information stored in the storage unit; and a switching unit, based on the permission/inhibition information obtained by the obtaining unit, switching whether execution of process allowed to be executed is permitted.

According to the present invention, in the electronic device system in which an electronic device and a connection device are connected to each other, the connection device stores, in advance, permission/inhibition information that indicates permission or inhibition of execution of process allowed to be executed by the electronic device. For example, when the connection device is connected, the electronic device obtains the permission/inhibition information stored in the connection device. Then, when the obtained permission/inhibition information indicates permission of execution of process, the electronic device executes the process. When the permission/inhibition information indicates inhibition of execution of process, the electronic device does not execute the process. Thus, whether the electronic device is to execute the process is allowed to be switched in correspondence to the permission/inhibition information stored in the connection device.

The electronic device system according to the present invention is characterized in that the electronic device includes a plurality of execution units respectively executing plural kinds of process, that the permission/inhibition information indicates whether execution of each process is permitted, and that the switching unit switches, based on the permission/inhibition information, whether execution of process performed by each execution unit is permitted.

According to the present invention, the electronic device includes a plurality of execution units respectively executing plural kinds of process, and the permission/inhibition information stored in the connection device indicates permission or inhibition of execution of each process. Then, the electronic device executes process whose execution is permitted in the permission/inhibition information obtained from the connection device, and does not execute process whose execution is inhibited in the permission/inhibition information. Thus, permission or inhibition of execution is allowed to be set up for each process allowed to be executed by the electronic device. This realizes finer restriction.

The electronic device system according to the present invention is characterized in that the permission/inhibition information indicates a permission/inhibition level expressed by a numerical value, that the electronic device includes a determination unit determining whether the permission/inhibition level indicated by the permission/inhibition information obtained by the obtaining unit is higher than or equal to a given level, and that the switching unit switches, based on the determination result obtained by the determination unit, whether execution of the process allowed to be executed is permitted.

According to the present invention, the permission/inhibition information stored in the connection device indicates a permission/inhibition level expressed by a numerical value. For example, when the permission/inhibition level indicated by the permission/inhibition information obtained from the connection device is higher than or equal to a given level, the electronic device executes the process. When the level is lower than the given level, the electronic device does not execute the process. The permission/inhibition information set up in advance in the connection device is a permission/inhibition level expressed by a numerical value. This permits easy determination of the permission/inhibition information and, hence, further reduces the burden at the time of setting up the permission/inhibition information into the connection device.

The electronic device system according to the present invention is characterized in that the electronic device includes: a plurality of execution units respectively executing plural kinds of process; and a level storage unit storing a level having been set up in advance for process to be performed by each execution unit, that the determination unit compares the permission/inhibition level indicated by the permission/inhibition information obtained by the obtaining unit with the level of each process stored in the level storage unit, and that the switching unit switches, based on the determination result obtained by the determination unit, whether execution of the process performed by each execution unit is permitted.

According to the present invention, the electronic device includes a plurality of execution units respectively executing plural kinds of process, and stores a level having been set up in advance for the process performed by each execution unit. The electronic device compares the permission/inhibition level indicated by the permission/inhibition information obtained from the connection device with the level of each process. For example, the electronic device executes process having a level lower than or equal to the permission/inhibition level, and does not execute process having a level higher (having a greater number) than the permission/inhibition level. Thus, finer restriction is achievable for each process allowed to be executed by the electronic device. Further, based on the permission/inhibition level expressed by a numerical value, permission or inhibition of execution of each process is allowed to be set up easily.

According to the present invention, in the electronic device, restriction (permission or inhibition) of execution of the process based on the permission/inhibition information is started when connection with the connection device is released. Thus, for example, in a manufacturing process for electronic devices, connection devices having mutually different kinds of permission/inhibition information are respectively connected to assembled electronic devices, and then each electronic device reads the permission/inhibition information stored in each connection device. As a result, despite that the electronic devices have the same hardware configuration, different kinds of process are allowed to be executed in correspondence to the permission/inhibition information stored in the individual connection devices. This realizes plural kinds of electronic devices having mutually different functions or performances.

According to the present invention, the electronic device and the connection device are connected to each other through connection units provided with SD (Secure Digital) standard terminals and extension terminals. The electronic device obtains permission/inhibition information from the connection device through the extension terminals of the connection units. Thus, compatibility with the SD standard is maintained.

An electronic device according to the present invention is an electronic device allowed to be connected to an external device, comprising: an obtaining unit obtaining, from an outside, permission/inhibition information that indicates whether execution of process allowed to be executed is permitted; and a switching unit switching, based on the permission/inhibition information obtained by the obtaining unit, whether execution of process allowed to be executed is permitted.

According to the present invention, when the permission/inhibition information obtained from the outside indicates permission of execution of process, the electronic device executes the process. When the permission/inhibition information indicates inhibition of execution of process, the electronic device does not execute the process. Thus, whether the electronic device is to execute the process is allowed to be switched in correspondence to the permission/inhibition information inputted to the electronic device.

According to the present invention, the electronic device includes a plurality of execution units respectively executing plural kinds of process, and executes process when the permission/inhibition information obtained from the outside indicates permission of execution of the process. In contrast, when the permission/inhibition information indicates inhibition of execution, the electronic device does not execute the process. Thus, permission or inhibition of execution is allowed to be set up for each process allowed to be executed by the electronic device. This realizes finer setting.

In the present invention, whether the electronic device is to execute the process is allowed to be changed in correspondence to the permission/inhibition information stored in the connection device. Thus, even in electronic devices having the same hardware configuration, electronic devices having mutually different functions or performances are realized with adopting mutually different kinds of permission/inhibition information. Since electronic devices having mutually different functions or performances are allowed to share a common hardware configuration, various problems are avoided that have been caused in an approach that plural kinds of electronic devices were manufactured with adopting mutually different hardware configurations. For example, the necessity of dedicated manufacturing facilities used for manufacturing plural kinds of electronic devices is avoided. Further, common components are allowed to be employed. Thus, cost reduction is achieved, and plural kinds of electronic devices are allowed to be manufactured at low costs. Further, a situation is avoided that worker need have technical knowledge for each electronic device. Thus, plural kinds of electronic devices are realized easily.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic diagram illustrating an external appearance of an SD memory card serving as an example of the connection device;

FIG. 4 is a schematic diagram illustrating contents stored in a permission/inhibition information table;

FIG. 5 is a flow chart illustrating a procedure of process performed by a process setting unit of an electronic device according to Embodiment 1; and FIG. 6 is a schematic diagram illustrating contents stored in a permission/inhibition information table according to Embodiment 2.

DETAILED DESCRIPTION

The following will describe in detail the present invention with reference to the drawings illustrating embodiments.

Embodiment 1

Figure 1:
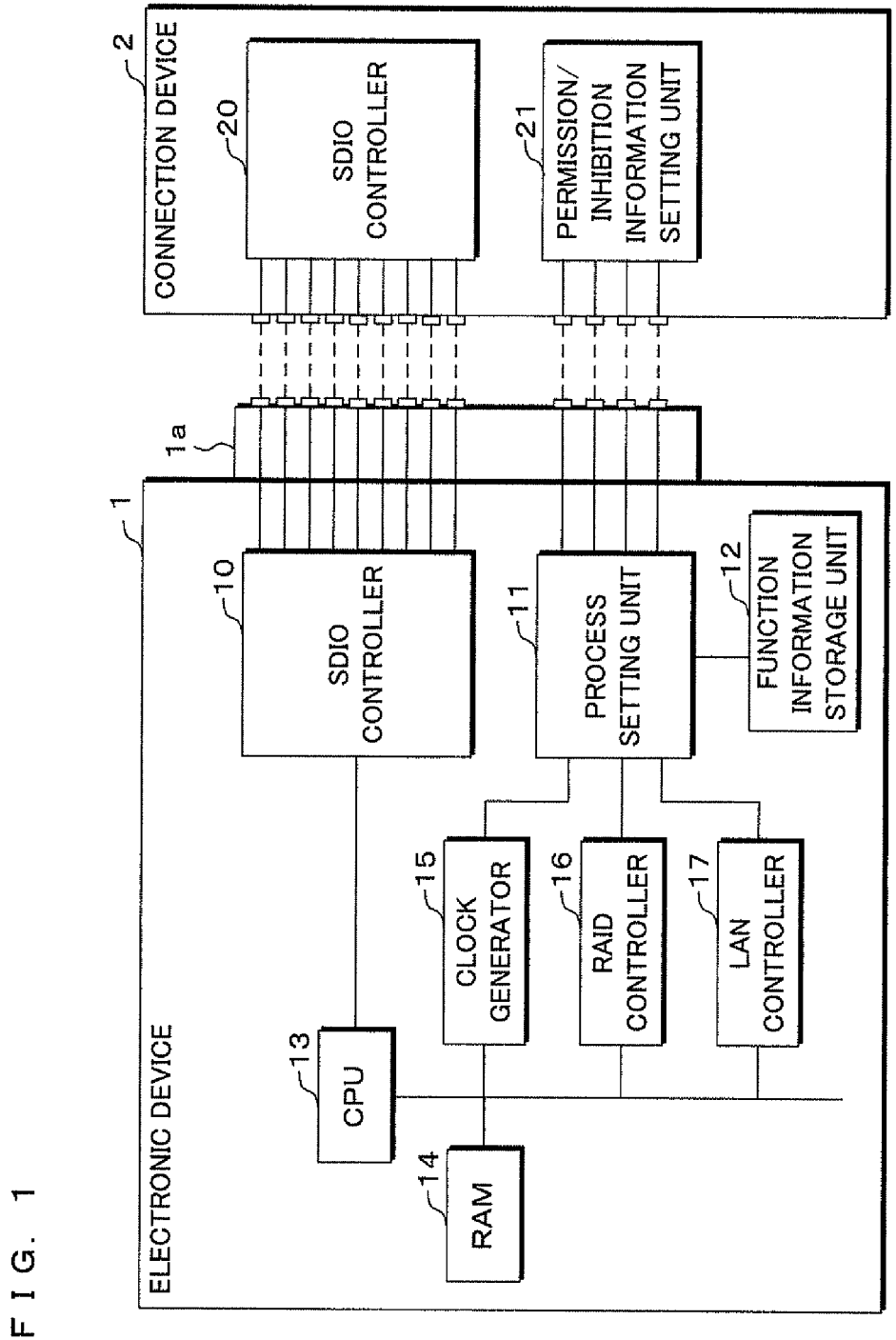
FIG. 1 is a block diagram illustrating a configuration of an electronic device system according to Embodiment 1.

FIG. 1 is a block diagram illustrating a configuration of an electronic device system according to Embodiment 1. The electronic device system according to the present Embodiment 1 includes an electronic device 1 and a connection device 2 allowed to be connected to the electronic device 1. The electronic device 1 and the connection device 2 are connected to each other through connectors, for example, according to the SD standard.

The electronic device 1 has an SD socket 1a to and from which the connection device 2 is attachable and detachable. The SD socket 1a is a connector used for connection with the connection device 2 and compatible with an SDIO interface used for input and output of data. The SD socket 1a is a connector, for example, according to the UHS-II (Ultra High Speed-II) standard and includes, for example, standard nine terminals compatible with the UHS-I standard and extension four terminals for extending use. Thus, the electronic device 1 and the connection device 2 are connected to each other through 13 signal lines. The UHS-II standard is compatible with the UHS-I standard.

FIG. 2 is a schematic diagram illustrating an external appearance of an SD memory card serving as an example of the connection device 2. Here, the connection device 2 is not limited to an SD memory card, and may be any kind of device as long as the device has a connector compatible with the UHS-II standard. FIG. 2 illustrates one face of the SD memory card.

The connection device 2 illustrated in FIG. 2 is an SD memory card compatible with the UHS-II standard, and has 13 terminals arranged in the outer peripheral surface and respectively connected to the 13 terminals provided in the SD socket 1a of the electronic device 1. The 13 terminals provided in the connection device 2 consist of standard nine terminals used for data transmission according to the SD standard and extension four terminals for extending use. As illustrated in FIG. 2, the standard nine terminals are arranged and aligned on an end side of the connection device 2, and the extension four terminals are arranged and aligned in the center part of the connection device 2.

When the connection device 2 is connected to the electronic device 1, the 13 terminals (the connection unit) provided in the SD socket 1a are connected directly to the 13 terminals (the connection unit) provided in the surface of the connection device 2.

The connection device 2 is a device compatible with the UHS-II standard. However, in addition to this, an SD device compatible with the UHS-I standard are also allowed to be connected to the electronic device 1 through the SD socket 1a. Here, when an SD device compatible with the UHS-I standard is connected to the electronic device 1, the connection is achieved only through the standard nine terminals of the SD socket 1a.

The connection device 2 includes an SDIO controller 20, a permission/inhibition information setting unit 21 and the like. As described above, the connection device 2 includes the 13 terminals. Then, among the 13 terminals, the standard nine terminals are connected to the SDIO controller 20, and the extension four terminals are connected to the permission/inhibition information setting unit 21. Here, in FIG. 1, nine terminals illustrated in the upper part are standard nine terminals, and four terminals illustrated in the lower part are extension four terminals.

The SDIO controller 20 serves as an interface for performing process of the device side in data transfer process based on the communication protocols of SDIO standard. When the connection device 2 is connected to the SD socket 1a of the electronic device 1, the SDIO controller 20 performs data transfer to and from the electronic device 1 by using the standard nine terminals. Further, electric power is supplied from the electronic device 1 to the connection device 2 through any one of the standard nine terminals. Then, the SDIO controller 20 supplies the electric power supplied from the electronic device 1 to each unit including the permission/inhibition information setting unit 21. The SDIO controller 20 is connected to each unit necessary for the connection device 2. However, their description is omitted for simplicity.

The permission/inhibition information setting unit 21 performs data transfer to and from the electronic device 1 through the extension four terminals. In the permission/inhibition information setting unit (storage unit) 21, permission/inhibition information that indicates whether execution of process allowed to be executed by the electronic device 1 is permitted is set up in advance. Then, when the connection device 2 is connected to the SD socket 1a of the electronic device 1, the permission/inhibition information setting unit 21 sends the permission/inhibition information to the electronic device 1 through the extension four terminals.

Figure 3:
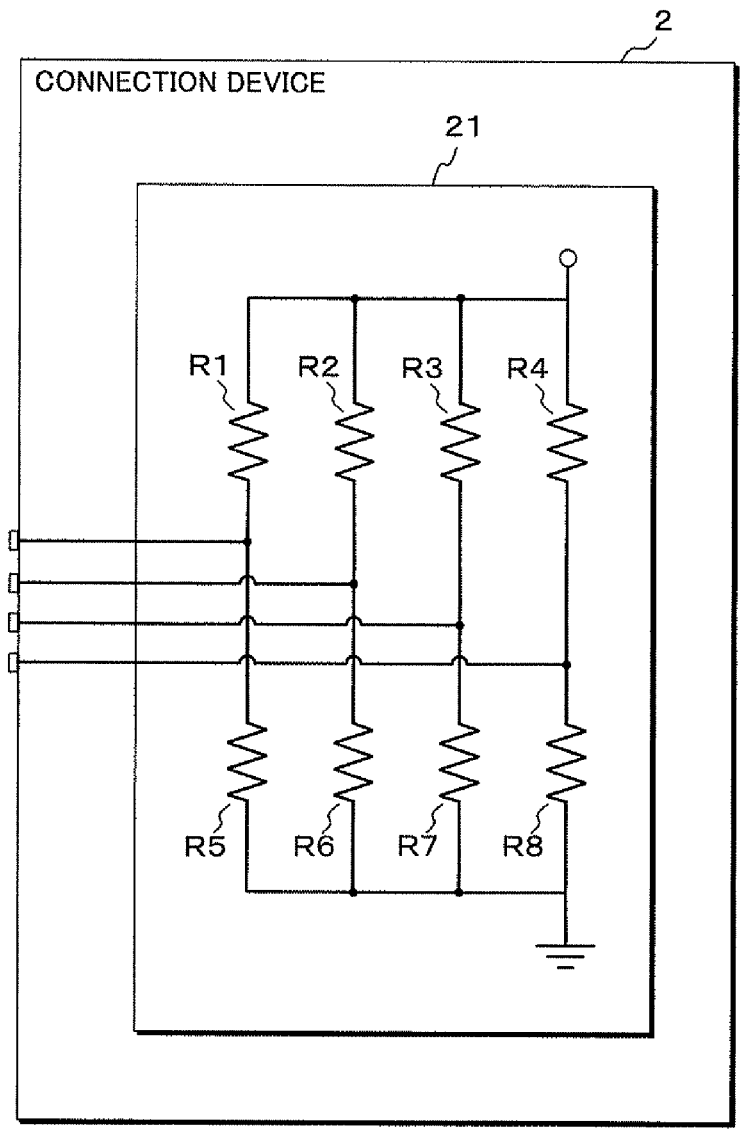
FIG. 3 is a circuit diagram illustrating an exemplary internal configuration of a permission inhibition information setting unit.

FIG. 3 is a circuit diagram illustrating an exemplary internal configuration of the permission/inhibition information setting unit 21. The permission/inhibition information setting unit 21 is provided with a fixed potential point connected to the power line (not illustrated) to which electric power is supplied from the electronic device 1. Then, when the connection device 2 is connected to the electronic device 1, the fixed potential point generates a given fixed potential. In the permission/inhibition information setting unit 21, each of the four signal lines connected to the individual extension four terminals is provided with one of pull-up resistors R1 to R4 connected to the fixed potential point or, alternatively, one of pull-down resistors R5 to R8 connected to the ground. When the resistor connected to a signal line is a pull-up resistor, the potential of the signal line becomes high "1". When the resistor connected to a signal line is a pull-down resistor, the potential of the signal line becomes low "0". Since a pull-up resistor or a pull-down resistor is installed in each signal line, the permission/inhibition information setting unit 21 outputs any one of 16 kinds of signals from (0, 0, 0, 0) to (1, 1, 1, 1) through the four signal lines.

Here, FIG. 3 illustrates a situation that each signal line is connected to one of the pull-up resistors R1 to R4 and one of the pull-down resistors R5 to R8. However, in the actual configuration, each signal line is connected to either a pull-up resistor or a pull-down resistor (e.g., the resistor R1 or R5, the resistor R2 or R6, . . . ).

The signal outputted by the permission/inhibition information setting unit 21 indicates permission/inhibition information, and the internal circuit of the permission/inhibition information setting unit 21 is set forth in advance. Then, the permission/inhibition information setting unit 21 outputs to the electronic device 1 a signal (permission/inhibition information) set forth in advance. That is, permission or inhibition of execution of the process allowed to be executed by the electronic device 1 is allowed to be changed for each of the connection device 2 connected to the electronic device 1 (for each of the permission/inhibition information set forth in the permission/inhibition information setting unit 21 of the connection device 2). Here, the permission/inhibition information setting unit 21 may be composed of a nonvolatile memory.

The electronic device 1 includes an SDIO controller 10, a process setting unit 11, a function information storage unit 12, a CPU (Central Processing Unit) 13, a RAM (Random Access Memory) 14, a clock generator 15, a RAID (Redundant Arrays of Inexpensive Disks) controller 16, a LAN (Local Area Network) controller 17, and the like. As described above, the SD socket 1a includes the 13 terminals. Then, among the 13 terminals, the standard nine terminals are connected to the SDIO controller 10, and the extension four terminals are connected to the process setting unit 11.

The SDIO controller 10 serves as an interface for performing process of the host side in data transfer process based on the communication protocols of SDIO standard. When the connection device 2 is connected to the SD socket 1a, the SDIO controller 10 performs data transfer to and from the connection device 2 by using the standard nine terminals of the SD socket 1a. Further, the power supply unit (not illustrated) is connected to the SDIO controller 10. Thus, when the connection device 2 is connected to the SD socket 1a, the SDIO controller 10 supplies the electric power supplied from the power supply unit to the connection device 2, by using any one of the standard nine terminals of the SD socket 1a.

The SDIO controller 10 is connected to the CPU 13 controlling the operation of each unit provided in the electronic device 1. The CPU 13 is connected to a RAM 14 temporarily storing the data generated at the time that the CPU 13 executes various kinds of process. The CPU 13 loads onto the RAM 14 a control program stored in advance in the storage unit (not illustrated), and then executes the program so as to cause the electronic device 1 to operate as an electronic device of the electronic device system according to the present invention.

The CPU 13 is connected to, in addition to the RAM 14, the clock generator (execution unit) 15, the RAID controller (execution unit) 16, and the LAN controller (execution unit) 17. The clock generator 15 executes the process of increasing the operating frequency of the CPU 13. The RAID controller 16 is connected to a plurality of hard disks (not illustrated), and executes the process of realizing a disk array by using a plurality of hard disks. The LAN controller 17 is connected to a LAN interface (not illustrated), and executes the process of controlling data transmission and reception through the LAN.

In addition, the CPU 13 is connected to various kinds of devices (execution units) necessary for the electronic device 1, such as a display and an operation unit. As for a configuration implementing the function of the electronic device 1 self, its description is omitted for simplicity.

The electronic device 1 according to the Embodiment 1 includes the execution units (devices) such as the clock generator 15, the RAID controller 16, and the LAN controller 17, and hence is allowed to execute various kinds of process (individual functions) implemented by the individual execution units. Here, the kinds of employable process in the electronic device 1 are not limited to these, and hence other execution units also may be employed.

The clock generator 15, the RAID controller 16, and the LAN controller 17 are connected also to the process setting unit 11. The process setting unit 11 obtains the output signal (the permission/inhibition information) from the permission/inhibition information setting unit 21 of the connection device 2. Based on the obtained output signal, the process setting unit 11 determines whether the operation of each of the execution units including the clock generator 15, the RAID controller 16, and the LAN controller 17 is to be activated or inactivated. Then, based on the determination result, the process setting unit 11 controls the operation of each execution unit.

The process setting unit 11 is configured by a microcomputer that includes: an operation unit performing calculation; a memory storing a control program necessary for arithmetic operation and information generated temporarily in association with execution of the arithmetic operation and the like; and input terminals and output terminals for the signals. Here, the input terminals of the process setting unit 11 are connected to four signal lines, and then connected to the extension four terminals through the four signal lines.

The process setting unit 11 is connected to the function information storage unit 12. The function information storage unit 12 is composed of a nonvolatile memory such as a flash memory. The function information storage unit 12 stores a permission/inhibition information table describing the correspondence between the output signal outputted from the permission/inhibition information setting unit 21 of the connection device 2 and the permission/inhibition information (identification of execution units to be activated) indicated by each output signal. FIG. 4 is a schematic diagram illustrating the contents stored in the permission/inhibition information table. The permission/inhibition information table illustrated in FIG. 4 stores the correspondence between each of five patterns of the output signal and each of execution units to be activated (execution unit that execution of process is to be permitted). The contents stored in the permission/inhibition information table are determined in advance by an administrator who administrates the electronic device system. Then, the permission/inhibition information table is stored in advance in the function information storage unit 12.

When the connection device 2 is connected to an SD socket 1a of the electronic device 1, the process setting unit (the obtaining unit) 11 obtains the output signal from the permission/inhibition information setting unit 21 of the connection device 2, and then reads, from the permission/inhibition information table, the permission/inhibition information (identification of execution units to be activated) corresponding to the obtained output signal. Then, in accordance with the permission/inhibition information that has been read from the permission/inhibition information table, the process setting unit (the switching unit) 11 permits (allows) the operation of the execution units to be activated (any one or all of the clock generator 15, the RAID controller 16, and the LAN controller 17).

For example, when the output signal from the permission/inhibition information setting unit 21 is (1, 1, 1, 1), the execution units to be activated are "all execution units". Thus, the process setting unit 11 instructs all of the clock generator 15, the RAID controller 16, and the LAN controller 17 to permit operation (start operation). As a result, the operation of all execution units is allowed.

Further, when the output signal from the permission/inhibition information setting unit 21 is (1, 1, 0, 1), the execution unit to be activated is the "clock generator". Thus, the process setting unit 11 instructs the clock generator 15 alone to permit operation (start operation). As a result, the operation of the clock generator 15 alone is allowed, and the operation of the other execution units (the RAID controller 16 and the LAN controller 17) is inhibited.

As such, based on the output signal from the permission/inhibition information setting unit 21 of the connection device 2, the process setting unit 11 permits or inhibits (activates or inactivates) the operation of each execution unit provided in the electronic device 1 so that execution of each process allowed to be executed by the electronic device 1 is allowed to be restricted.

The process setting unit 11 may be composed of a PLD (Programmable Logic Device) or a general-purpose logic IC (Integrated Circuit) or, alternatively, may be constructed from a plurality of ICs.

FIG. 5 is a flow chart illustrating a procedure of process performed by the process setting unit 11 of the electronic device 1 according to Embodiment 1. When the electronic device 1 is started, the process setting unit 11 of the electronic device 1 is started (S1). When the connection device 2 is already connected to the SD socket 1a of the electronic device 1, the process setting unit 11 detects the potentials on the signal lines connected to the extension four terminals so as to obtain the output signal from the permission/inhibition information setting unit 21 of the connection device 2, and thereby obtains the permission/inhibition information having been set up in advance by the permission/inhibition information setting unit 21 (S2).

Based on the contents stored in the permission/inhibition information table stored in the function information storage unit 12, the process setting unit 11 identifies execution units to be activated, that the execution units indicated by the obtained permission/inhibition information (S3). From the identification result, the process setting unit 11 determines whether there is an execution unit to be activated (S4). When there is an execution unit to be activated (S4: YES), the process setting unit 11 instructs the execution unit to permit operation (S5). As a result, execution of the process is allowed in the execution unit whose operation permission is indicated by the permission/inhibition information. When there is no execution unit to be activated (S4: NO), the process setting unit 11 skips the process of step S5 and then terminates the process.

Here, each of the execution units such as the clock generator 15, the RAID controller 16, and the LAN controller 17 is in a stop state when a given signal is being inputted from the process setting unit 11. Then, when the given signal is stopped, each execution unit becomes active. In this configuration, when the operation of each execution unit is to be inactivated, it is sufficient that the process setting unit 11 inputs the given signal to the execution unit. When the operation of each execution unit is to be activated, it is sufficient that the inputting of the given signal to the execution unit is stopped.

In the Embodiment 1, based on the permission/inhibition information (the output signal) set up in advance in the permission/inhibition information setting unit 21 of the connection device 2, the process setting unit 11 of the electronic device 1 restricts the operation (permits or inhibits the execution) of each execution unit provided in the electronic device 1. Thus, when the permission/inhibition information stored in the connection device 2 is changed, the kind of process allowed to be executed by the electronic device 1 is changed. Thus, in the electronic devices 1 having the same hardware configuration, when the connection devices 2 storing mutually different permission/inhibition information are connected thereto, electronic devices 1 having mutually different functions or performances are realized. Further, in the Embodiment 1, whether the process is to be activated or inhibited is allowed to be set up for each process allowed to be executed by the electronic device 1. Thus, The finer restriction is achievable. Further, in the Embodiment 1, the output signal (the permission/inhibition information) obtained by the electronic device 1 from the connection device 2 is transferred through the extension four terminals. Thus, the standard nine terminals are not affected, and hence compatibility with the SD standard is maintained.

In the permission/inhibition information table according to the Embodiment 1, in correspondence to each output signal from the permission/inhibition information setting unit 21 of the connection device 2, one execution unit or all execution units are set to be a unit or units to be activated. In addition, in correspondence to an output signal, an arbitrary plural number of execution units may be set to be units to be activated.

Further, in the electronic device 1 according to the Embodiment 1, the control process of activating or inactivating the operation of each execution unit based on the permission/inhibition information performed by the process setting unit 11 may be started after the connection device 2 is removed from the SD socket 1a of the electronic device 1. In this case, for example, in the manufacturing process for the electronic devices 1, the connection devices 2 having mutually different kinds of permission/inhibition information are respectively connected to the assembled electronic devices 1, and then each electronic device 1 reads the permission/inhibition information stored in each connection device 2. Thus, by using the electronic devices 1 having the same hardware configuration, plural kinds of electronic devices 1 having mutually different functions or performances are manufactured. Here, in this case, a configuration may be employed that the process setting unit 11 stores into a storage unit (not illustrated) the intact output signal from the permission/inhibition information setting unit 21 of the connection device 2. Alternatively, a configuration may be employed that information of the execution unit identified as a to-be-activated execution unit based on the output signal is stored into a storage unit.

Embodiment 2

An electronic device system according to Embodiment 2 is described below. The electronic device system according to the Embodiment 2 has a configuration similar to the electronic device system according to the above-mentioned Embodiment 1. Thus, like configuration components are designated by like numerals, and hence their description is omitted.

In the electronic device system according to the Embodiment 2, the contents of the permission/inhibition information table stored in the function information storage unit 12 of the electronic device 1 are different from those of the above-mentioned Embodiment 1.

FIG. 6 is a schematic diagram illustrating contents stored in the permission/inhibition information table according to Embodiment 2. The permission/inhibition information table illustrated in FIG. 6 stores the correspondence between each execution unit provided in the electronic device 1 and a level having been set up in advance for the process performed by each execution unit. Also in the present Embodiment 2, the contents stored in the permission/inhibition information table are determined in advance by an administrator who administrates the electronic device system. Then, the permission/inhibition information table is stored in advance in the function information storage unit (the level storage unit) 12.

The permission/inhibition information setting unit 21 of the connection device 2 according to the Embodiment 2 has a configuration similar to the permission/inhibition information setting unit 21 according to Embodiment 1. However, the output signal from the permission/inhibition information setting unit 21 indicates a permission/inhibition level, where the level of permission or inhibition of execution of the process performed by each execution unit provided in the electronic device 1 (each process allowed to be executed by the electronic device 1) is expressed by a numerical value. That is, the permission/inhibition information setting unit 21 according to the Embodiment 2 outputs any one of 16 kinds of signals (permission/inhibition levels) from 0 (0, 0, 0, 0) to 15 (1, 1, 1, 1). Here, correspondence is determined in advance between the individual bit signals outputted through the extension four terminals and the individual bits from the most significant bit to the least significant bit.

When the connection device 2 is connected to the SD socket 1a of the electronic device 1, the process setting unit 11 of the electronic device 1 obtains an output signal from the permission/inhibition information setting unit 21 of the connection device 2. The process setting unit (the determination unit) 11 compares the permission/inhibition level indicated by the obtained output signal with the level of each execution unit stored in the permission/inhibition information table. For example, the process setting unit 11 determines whether any execution unit has a level lower than or equal to the permission/inhibition level indicated by the output signal, and then identifies that the execution unit having a level lower than or equal to the permission/inhibition level is an execution unit to be activated. Here, instead, a device having a level higher than or equal to the permission/inhibition level indicated by the output signal may be identified as an execution unit to be activated.

When an execution unit to be activated has been identified, the process setting unit 11 instructs the identified execution unit to permit operation (start operation). As a result, the operation of the execution unit having a level lower than or equal to the permission/inhibition level is allowed, and the operation of the other execution units is inhibited.

For example, when the output signal from the permission/inhibition information setting unit 21 is 9 (1001 in binary), based on the contents stored in the permission/inhibition information table, the process setting unit 11 identifies, as to-be-activated execution units, the clock generator 15 and the RAID controller 16 having a level of 9 or lower. Then, the process setting unit 11 instructs the clock generator 15 and the RAID controller 16 to permit operation (start operation). As a result, the operation of the LAN controller 17 having a level higher than the permission/inhibition level of 9 is inhibited, and the operation of the clock generator 15 and the RAID controller 16 having a level of 9 or lower is allowed.

The process setting unit 11 of the electronic device 1 according to the Embodiment 2 performs process similar to that illustrated in the flow chart of FIG. 5. Here, at step S3 in the process illustrated in the flow chart of FIG. 5, the process setting unit 11 of the electronic device 1 according to the Embodiment 2 compares the permission/inhibition level indicated by the output signal obtained from the permission/inhibition information setting unit 21 of the connection device 2 with the level of each execution unit stored in the permission/inhibition information table. Then, based on the comparison result, the process setting unit 11 identifies an execution unit to be activated. The other points in the process are similar to those in the process described in the above-mentioned Embodiment 1, and hence their description is omitted.

Also in the Embodiment 2, effects similar to those of the above-mentioned Embodiment 1 are obtained. Further, in the Embodiment 2, the permission/inhibition information (an output signal) set up in advance in the permission/inhibition information setting unit 21 of the connection device 2 indicates a permission/inhibition level expressed by a numerical value. This permits easy determination of the permission/inhibition information.

Further, also in the electronic device system according to the present Embodiment 2, modifications similar to those described in the above-mentioned Embodiment 1 may be applied.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic device system comprising: an electronic device executing process; and a connection device allowed to be connected to the electronic device, wherein
   the electronic device and the connection device are connected to each other through connection units provided with SD (Secure Digital) standard terminals and extension terminals,
   the connection device includes a storage unit that stores permission/inhibition information indicating whether execution of process allowed to be executed by the electronic device is permitted, and
   the electronic device includes a processor that executes:
      code for obtaining permission/inhibition information stored in the storage unit of the connection device through the extension terminals of the connection units without using the SD standard terminals of the connection units, when the connection device is connected through the connection units;
      code for storing information relating to permission or inhibition of execution of the process based on the obtained permission/inhibition information; and
      code for starting, based on the stored information, permission or inhibition of execution of process allowed to be executed after connection with the connection device is released.

2. The electronic device system according to claim 1, wherein the processor further executes:
   code for executing plural kinds of process,
   the permission/inhibition information indicates whether execution of each process is permitted,
   code for storing the information relating to permission or inhibition of execution of each process, and
   code for switching, based on the stored information, whether each execution of process is permitted.

3. The electronic device system according to claim 1, wherein
   the permission/inhibition information indicates a permission/inhibition level expressed by a numerical value,
   wherein the processor further executes:
   code for determining whether the permission/inhibition level indicated by the permission/inhibition information obtained by the obtaining unit is higher than or equal to a given level,
   code for storing, based on the obtained determination result, the information relating to permission or inhibition of execution of the process, and
   code for switching, based on the stored information, whether execution of process allowed to be executed is permitted.

4. The electronic device system according to claim 3, wherein
   the processor further executes:
      code for executing plural kinds of process; and
      code for storing a level having been set up in advance for process to be performed by each process,
   code for comparing the permission/inhibition level indicated by the obtained permission/inhibition information with the stored level of each process,
   code for storing the information relating to permission or inhibition of execution of each process, and
   code for switching, based on the stored information, whether execution of each process performed is permitted.

5. An electronic device allowed to be connected to an external device, comprising:
   a connection unit provided with SD (Secure Digital) standard terminals and extension terminals, the electronic device including a processor that executes:

code for obtaining through the extension terminals of the connection unit, from the external device without using the SD standard terminals of the connection units, permission/inhibition information indicating whether execution of process allowed to be executed is permitted when the external device is connected through the connection unit;

code for storing information relating to permission or inhibition of execution of the process based on the obtained permission/inhibition information; and code for starting, based on the stored information, permission or inhibition of execution of process allowed to be executed after connection with the external device is released.

6. The electronic device according to claim 5, wherein the processor further executes:

code for executing plural kinds of process, the permission/inhibition information indicates whether execution of each process is permitted, code for storing the information relating to permission or inhibition of execution of each process, and code for switching, based on the stored information, whether each execution of process is permitted.

* * * * *